(12) United States Patent
Su et al.

(10) Patent No.: US 12,389,360 B2
(45) Date of Patent: Aug. 12, 2025

(54) METHOD AND SYSTEM FOR COMMUNICATION IN SERVICE MANAGEMENT AND ORCHESTRATION

(71) Applicant: LITE-ON TECHNOLOGY CORPORATION, Taipei (TW)

(72) Inventors: Chih-Wei Su, Taipei (TW); Pei-Hsuan Lin, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 421 days.

(21) Appl. No.: 18/163,971

(22) Filed: Feb. 3, 2023

(65) Prior Publication Data
US 2023/0189193 A1    Jun. 15, 2023

(30) Foreign Application Priority Data
Oct. 11, 2022    (CN) .......................... 202211241527.4

(51) Int. Cl.
*H04W 60/04*    (2009.01)
*H04W 8/18*    (2009.01)

(52) U.S. Cl.
CPC ............. *H04W 60/04* (2013.01); *H04W 8/18* (2013.01)

(58) Field of Classification Search
CPC ...... H04W 60/04; H04W 8/18; H04L 41/342; H04L 41/0853
USPC ...................................................... 455/435.1
See application file for complete search history.

(56) References Cited

U.S. PATENT DOCUMENTS

| | | | |
|---|---|---|---|
| 11,836,551 B2 * | 12/2023 | Subramani Jayavelu | ................... G06F 9/546 |
| 2022/0014942 A1 | 1/2022 | Dawei Ying | |
| 2024/0196178 A1 * | 6/2024 | Ying | .................. H04W 8/18 |
| 2024/0388503 A1 * | 11/2024 | Bhangu | ................. H04L 41/342 |

FOREIGN PATENT DOCUMENTS

| | | |
|---|---|---|
| CN | 114095367 A | 2/2022 |
| WO | 2022060923 A1 | 3/2022 |
| WO | 2022155511 A1 | 7/2022 |

OTHER PUBLICATIONS

O-Ran Working Group 1: "Decoupled SMO architecture", Oct. 7, 2022 (Oct. 7, 2022), pp. 1-21, XP093127699 (Year: 2022).*
Working Group 2: "Non-RT RIG Architecture, v02.01, O-RAN. WG2.Non-RT-RIC-ARCH-TS-v02.01", Jul. 30, 2022 (Jul. 30, 2022), pp. 1-39, XP093127722. (Year: 2022).*

(Continued)

*Primary Examiner* — Hirdepal Singh
(74) *Attorney, Agent, or Firm* — McClure, Qualey & Rodack, LLP

(57) ABSTRACT

A method for communication in service management and orchestration is provided. The method includes receiving, by a Non-real time radio access network (RAN) Intelligent Controller (Non-RT RIC) framework, a first subscription message from an Element Management System (EMS), wherein the first subscription message is used to request second data used to run a Non-RT RIC application (rApp). The method includes transmitting, by the Non-RT RIC framework, a first callback message to the rApp according to the first subscription message to notify the rApp that the EMS requests the second data. The method includes transmitting, by the rApp, the second data to the EMS according to the first callback message.

20 Claims, 8 Drawing Sheets

(56) References Cited

OTHER PUBLICATIONS

Extended European Search Report dated Feb. 19, 2024, issued in application No. EP 23165928.5.
"O-Ran Working Group 1—Decoupled SMO architecture;" Technical Report; Oct. 2022; pp. 1-21.
"O-RAN Working Group 2—Non-RT RIC Architecture;" Technical Specification; Jul. 2022; pp. 1-39.
"Working Group 1—O-RAN Architecture Description;" Technical Specification; Jul. 2022; pp. 1-39.
Liteon Technology Corp; "Liteon Solution for 5G Small Cell;" Feb. 2022; pp. 1-13.
Chinese language Notice of Allowance dated Jan. 22, 2025, issued in application No. CN 202211241527.4.

\* cited by examiner

METHOD AND SYSTEM FOR COMMUNICATION IN SERVICE MANAGEMENT AND ORCHESTRATION

CROSS REFERENCE TO RELATED APPLICATIONS

This application claims priority from China Patent Application No. 202211241527.4, filed on Oct. 11, 2022, the disclosure of which is incorporated herein in its entirety by reference.

BACKGROUND OF THE INVENTION

Field of the Invention

The present disclosure generally relates to Open Radio Access Network (O-RAN) technology. More specifically, aspects of the present disclosure relate to a method and system for communication in service management and orchestration.

Description of the Related Art

"Softwarization of Everything" is a concept that has generally become accepted in recent years in the fields of network, computing, and communication. In recent years, the theory of software-defined radio has been gradually implemented in mobile communication networks. Software-defined cellular networks based on key enabling technologies such as "Softwarization", "Virtualization" and disaggregation of networking functionalities have been regarded as key technologies that can support B5G/6G for fast network optimization in the future. In the past, the 4G network was designed in the form of a blackbox, which will not be able to bear highly flexible configuration conditions in the future. Many telecom operators are gradually turning their attention to the research and implementation of Open Radio Access Network (Open RAN). Open RAN has attracted much attention through the network integration and deployment of hardware and software of different telecommunication providers through an open user interface. The establishment of the O-RAN Alliance solves the problem wherein a single manufacturer's research and development requires a lot of human resources and money, and undoubtedly provides a great boost to the research and development of the Open RAN. O-RAN Software Community (O-RAN SC) is responsible for developing the open source software modules required for O-RAN function definition, and manages all software development related to the wireless access network (including technical documentation, testing and integration of various open source software), code storage, tools and developer integration testing work, so that the software code is consistent with the open architecture and specifications of the O-RAN Alliance.

O-RAN is an Open RAN version standardized by the O-RAN Alliance. O-RAN is built on the basis of 3GPP TS 38.401, including new functions, open and interoperable interfaces. This new approach to RAN architecture may bring some benefits related to increased supply chain diversity and reduced deployment costs, while increasing network integration costs and complexity.

FIG. 1 is an architecture diagram of the O-RAN system 100. As shown in the FIG. 1, the O-RAN system 100 is composed of seven main parts: a service management and orchestration (SMO) framework 110 including a Non-real time radio access network (RAN) Intelligent Controller (Non-RT RIC) 1112, a Near-real time RAN Intelligent Controller (Near-RT RIC) 120, a O-RAN central unit (O-CU) composed of a O-RAN central unit control plane (O-CU-CP) 1302 and a O-RAN central unit user plane (O-CU-UP) 1304, a O-RAN distributed unit (O-DU) 140, a O-RAN radio unit (O-RU) 150, a O-RAN evolved node B (O-eNB) 160 and a O-RAN cloud (O-Cloud) 170.

The above parts may be connected to each other through the standard interfaces O1, O2, A1, E2, Open FH M-Plane and Open FH CUS-Plane defined by O-RAN. The O-CU-CP 1302, the O-CU-UP 1304 and the O-DU 140 may be connected to each other through the interfaces E1, F1-c, F1-u, NG-u, NG-c, X2-u, X2-u, Xn-u, Xn defined in 3GPP TR 38.801 "Study on new radio access technology: Radio access architecture and interfaces", 3GPP TR 38.806 "Study of separation of NR Control Plane (CP) and User Plane (UP) for split option 2", 3GPP TR 38.816 "Study on Central Unit (CU)—Distributed Unit (DU) lower layer split for NR", 3GPP TS 38.47x "series study CU/DU split architecture " and 3GPP TS 38.46x "series study control-user plane separation".

FIG. 2 is a structural diagram of the SMO framework 200. The SMO framework 200 mainly comprises an Element Management System (EMS) 210 and a Non-real time RAN Intelligent Controller (Non-RT RIC) 220. The Non-RT RIC 220 is an internal function of the SMO framework 200 in the O-RAN architecture, and may provide an A1 interface for a near-RT RIC.

The O1 interface is used to connect the SMO framework 200 and the equipment terminal (O-eNB), the O2 interface is used to connect the SMO framework 200 and the O-RAN cloud, and the Open FH M-plane interface is used to connect the SMO framework 200 and the O-RAN radio unit.

The Non-RT RIC 220 is composed of a Non-RT RIC framework 222 and a Non-RT RIC application program (rApps) 224. The Non-RT RIC 220 exposes required services to the Non-RT RIC application 224 through the R1 interface.

However, the current SMO framework 200 does not clearly define how the EMS 210 provides information to the Non-RT RIC 220. Therefore, a method and system for communication in the service management and orchestration are needed to define the operation process between the EMS 210 and the Non-RT RIC 220 to make the SMO framework more complete.

BRIEF SUMMARY OF THE INVENTION

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide method and system for communication in the service management and orchestration to make the SMO framework more complete.

In an exemplary embodiment, a method for communication in service management and orchestration is provided. The method comprises receiving, by a Non-real time radio access network (RAN) Intelligent Controller (Non-RT RIC) framework, a first subscription message from an Element Management System (EMS), wherein the first subscription message is used to request second data used to run a Non-RT RIC application (rApp). The method comprises transmitting, by the Non-RT RIC framework, a first callback message to the rApp according to the first subscription message to notify the rApp that the EMS requests the second data. The method comprises transmitting, by the rApp, the second data to the EMS according to the first callback message.

In some embodiments, before the rApp transmits the second data to the EMS according to the first callback message, the method further comprises: transmitting, by the rApp, a second subscription message to the Non-RT RIC framework, wherein the second subscription message is used to request first data used to generate the second data; transmitting, by the Non-RT RIC framework, a second callback message to the EMS according to the second subscription message; transmitting, by the EMS, the first data to the rApp according to the second callback message; and obtaining, by the rApp, the second data according to the first data.

In some embodiments, the method further comprises: reading, by the EMS, the second data, and displaying the second data on a web service page.

In some embodiments, before the Non-RT RIC framework receives the first subscription message from the EMS, the method further comprises performing, by the EMS, a first registration procedure on the Non-RT RIC framework. The method further comprises performing, by the rApp, a second registration procedure on the Non-RT RIC framework.

In some embodiments, the first registration procedure comprises the following steps: transmitting, by the EMS, a first registration request message to the Non-RT RIC framework to request registration of the EMS; transmitting, by the EMS, a first subscription request message to the Non-RT RIC framework to request to subscribe to the data required by the EMS; transmitting, by the EMS, a first information type registration message to the Non-RT RIC framework to request registration of the information types provided by the EMS; and transmitting, by the EMS, g a first information producer registration message to the Non-RT RIC framework to request to register the EMS as an information producer.

In some embodiments, the second registration procedure comprises the following steps: transmitting, by the rApp, a second registration request message to the Non-RT RIC framework to request registration of the rApp; transmitting, by the rApp, a second subscription request message to the Non-RT RIC framework to request to subscribe to the data required by the rApp; transmitting, by the rApp, a second information type registration message to the Non-RT RIC framework to request registration of the information types provided by the rApp; and transmitting, by the rApp, a second information producer registration message to the Non-RT RIC framework to request to register the rApp as an information producer.

In some embodiments, an IP address of the EMS is included in the first subscription message and the first callback message.

In some embodiments, an IP address of the rApp is included in the second subscription message and the second callback message.

In some embodiments, the Non-RT RIC framework is connected with the EMS through a service management and orchestration (SMO) internal interface.

In some embodiments, the Non-RT RIC framework is connected with the rApp through an R1 interface.

In an exemplary embodiment, a system for communication in service management and orchestration is provided. The system comprises an Element Management System (EMS), a Non-real time radio access network (RAN) Intelligent Controller (Non-RT RIC) application (rApp) and a Non-RT RIC framework. The Non-RT RIC framework is coupled to the EMS and the rApp. The Non-RT RIC framework receives a first subscription message from the EMS, wherein the first subscription message is used to request second data used to run the rApp. The Non-RT RIC framework transmits a first callback message to the rApp according to the first subscription message to notify the rApp that the EMS requests the second data. The rApp transmits the second data to the EMS according to the first callback message.

BRIEF DESCRIPTION OF THE DRAWINGS

The accompanying drawings are included to provide a further understanding of the present disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION OF THE INVENTION

The embodiments of the present disclosure provide a method and a system for communication in service management and orchestration, which defines the operation specification between the EMS and the Non-RT RIC, so as to further improve the O-RAN function.

Figure 1:
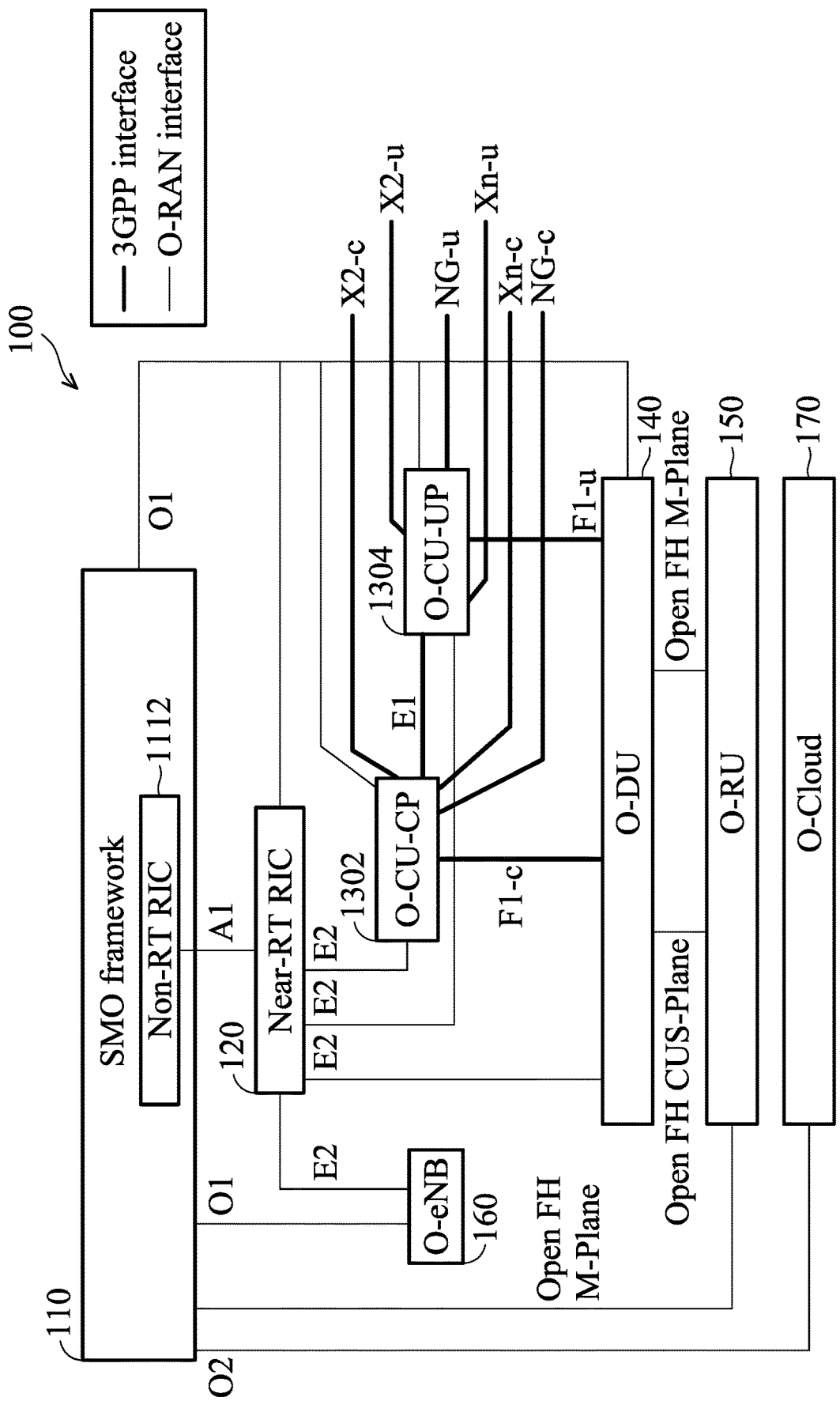
FIG. 1 is an architecture diagram of the O-RAN system.
Figure 2:
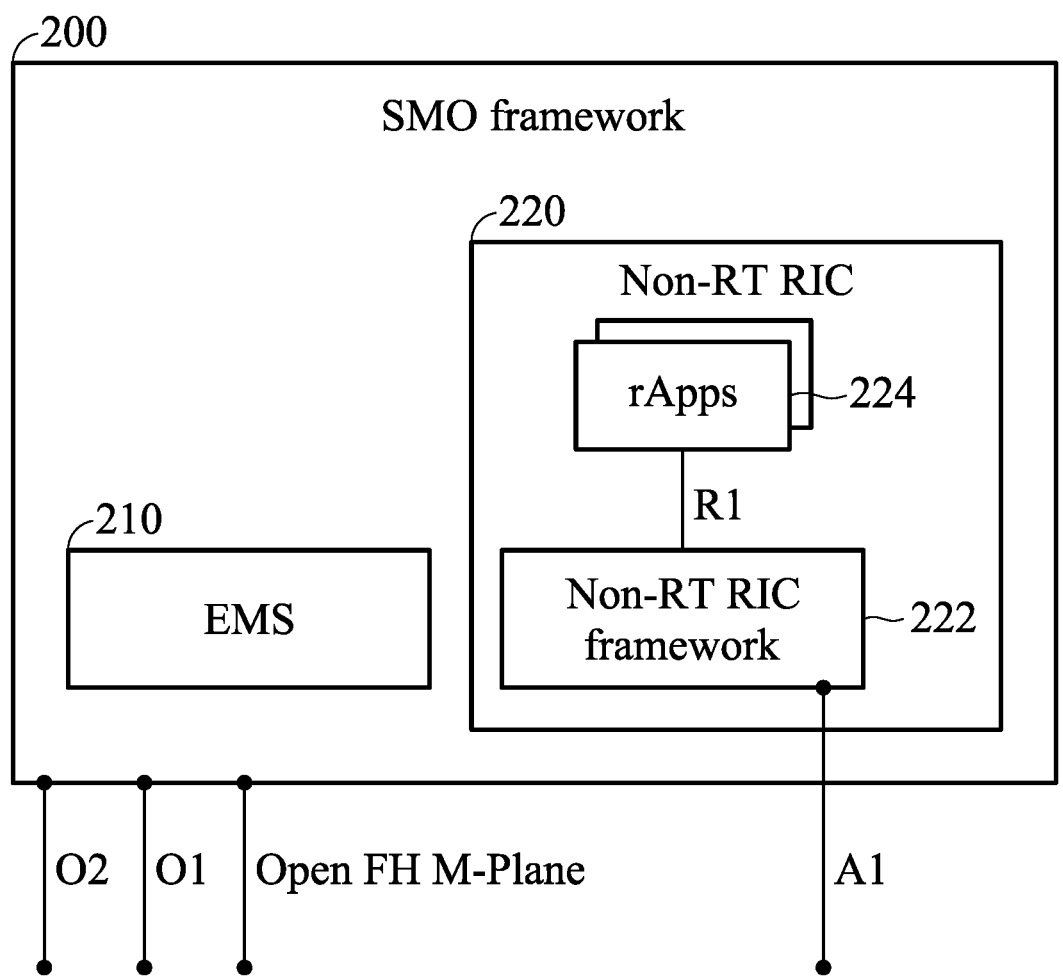
FIG. 2 is a structural diagram of the SMO framework.
Figure 3:
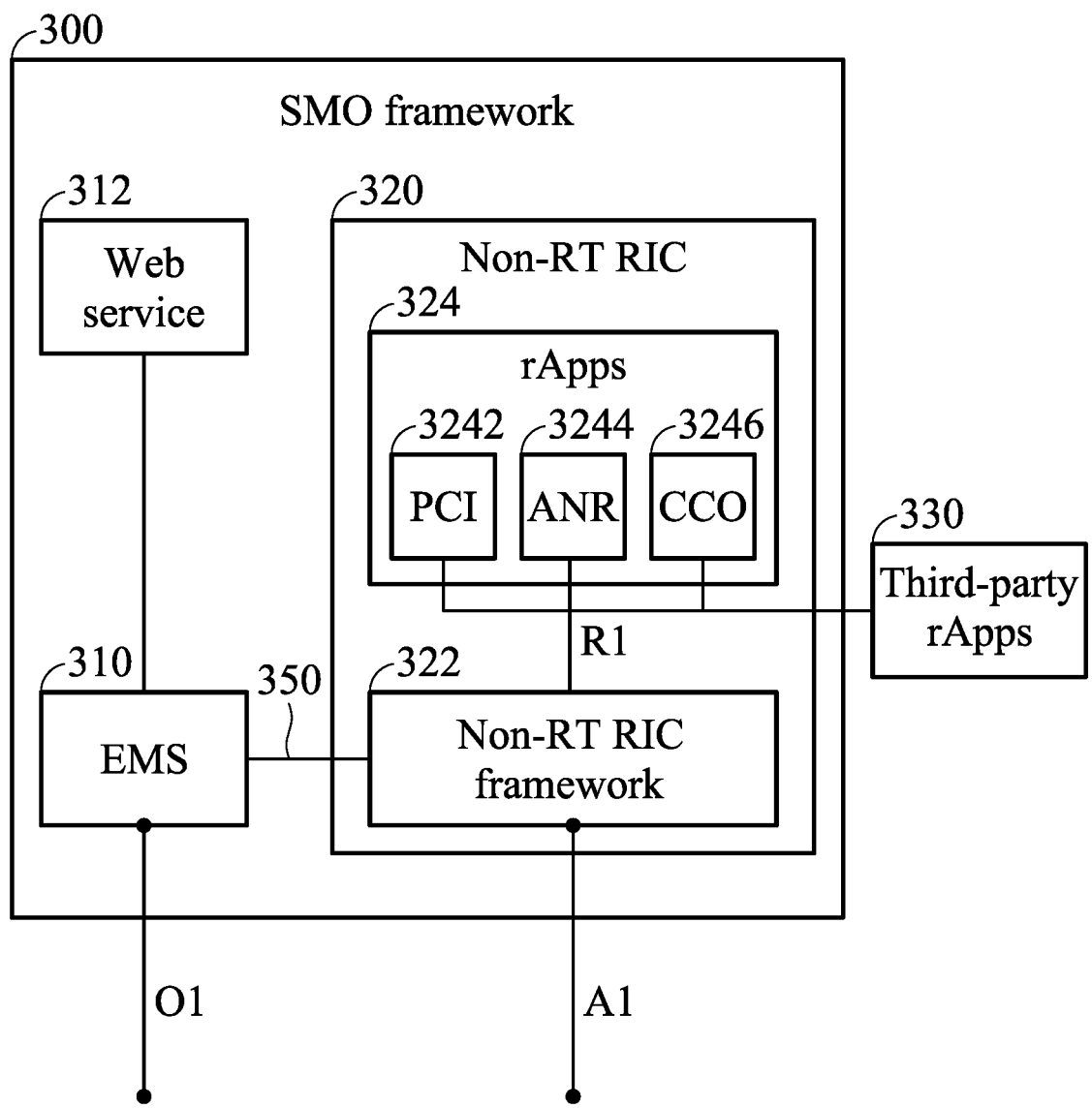
FIG. 3 is a schematic diagram of an SMO framework according to an embodiment of the present disclosure.

FIG. 3 is a schematic diagram of an SMO framework 300 according to an embodiment of the present disclosure. The SMO framework 300 mainly comprises an Element Management System (EMS) 310 and a Non-real time RAN Intelligent Controller (Non-RT RIC) 320.

The EMS 310 provides the function of supporting fault, configuration, audit, performance and security (FCAPS) of the O-RAN network through the O1 interface.

The main function of the Non-RT RIC 320 is to optimize the intelligent RAN by providing guidance policy, machine learning (ML) model management and information to the Near-RT RIC, so that the RAN can be optimized under certain conditions. The Non-RT RIC 320 may also perform intelligent radio resource management functions at non-instantaneous intervals (i.e., greater than 1 second). The Non-RT RIC 320 may use data analysis and AI/ML training/inference to determine the RAN optimal operations that the Non-RT RIC 320 may utilize SMO services.

The Non-RT RIC 320 comprises a Non-RT RIC framework 322 and Non-RT RIC applications (rApps) 324, wherein the Non-RT RIC framework 322 discloses required services to the rApps 324 through the R1 interface (regardless of whether the service is from the Non-RT RIC framework 322 or the SMO framework 300), so that the rApps 324 may obtain information and trigger operations (for example, assign physical layer ID (PCI) 3242, Coverage and Capacity Optimization (CCO) 3244, Auto Neighbor Relation (ANR) 3246, or operations provided by other third-party rApps 330) through the A1, O1, O2 and Open FH M-Plane interfaces.

The EMS 310 may be connected to a web service 312. The web service 312 provides an operator/manager to transmit the management intent to the EMS 310 through a human-machine interface (for example, in the form of a web service). The EMS 310 may convert the received intent into corresponding program instructions, and trigger related actions at the bottom layer to achieve the purpose of adjustment and management. The EMS 310 is connected to the Non-RT RIC framework 322 through a Service Management and Orchestration (SMO) internal interface 350.

It should be noted that the EMS 310, the Non-RT RIC framework 322 and the rApps 324 in the SMO framework 300 may be implemented as a network element on dedicated hardware (e.g., a computing device, a server, or a processing circuit of a processor in a computing device or server), or as a software instance running on dedicated hardware, or as a virtualized function instantiated on an appropriate platform, e.g., a cloud infrastructure.

Figure 10:
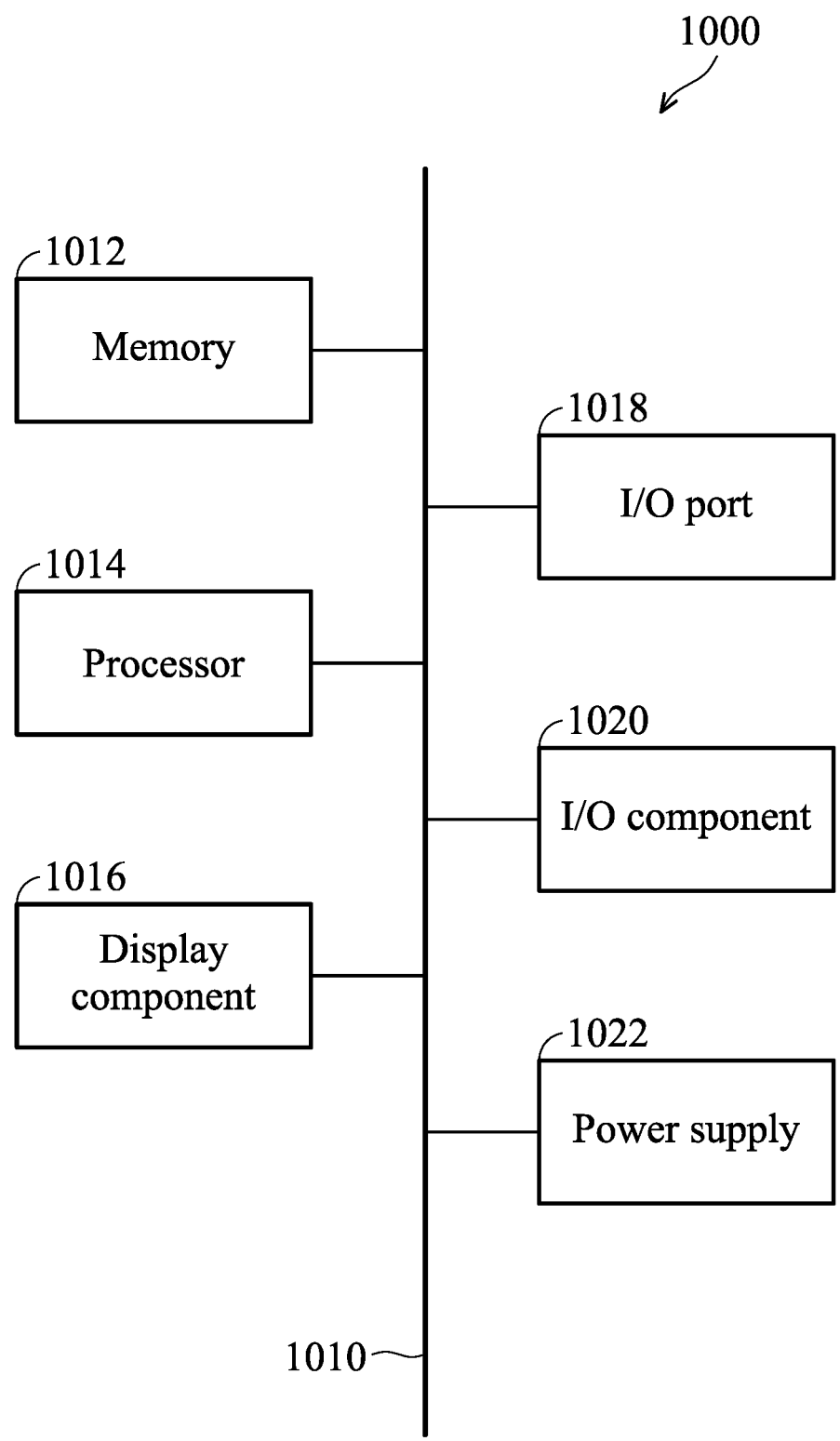
FIG. 10 illustrates an exemplary operating environment for implementing embodiments of the present disclosure.

It should be understood that when the EMS 310, the Non-RT RIC framework 322 and the rApps 324 are used as dedicated hardware, the EMS 310, the Non-RT RIC framework 322 and the rApps 324 may be implemented via any type of computing device, such as the electronic device 1000 described with reference to FIG. 10, as shown in FIG. 10.

FIGS. 4-7 illustrate a process of registering the EMS and the rApp with the Non-RT RIC framework, a process of the EMS and the rApp subscribing data to the Non-RT RIC framework, a process of registering an information type provided by the EMS and the rApp with the Non-RT RIC framework for a service, and a process of registering the EMS and the rApp with the Non-RT RIC framework as an information producer.

It should be noted that although the operation performed by the rApp in FIGS. 4 to 7 is based on Coverage and Capacity Optimization (CCO) as an example, those skilled in the art can make appropriate replacements or adjustments according to this embodiment.

Figure 4:
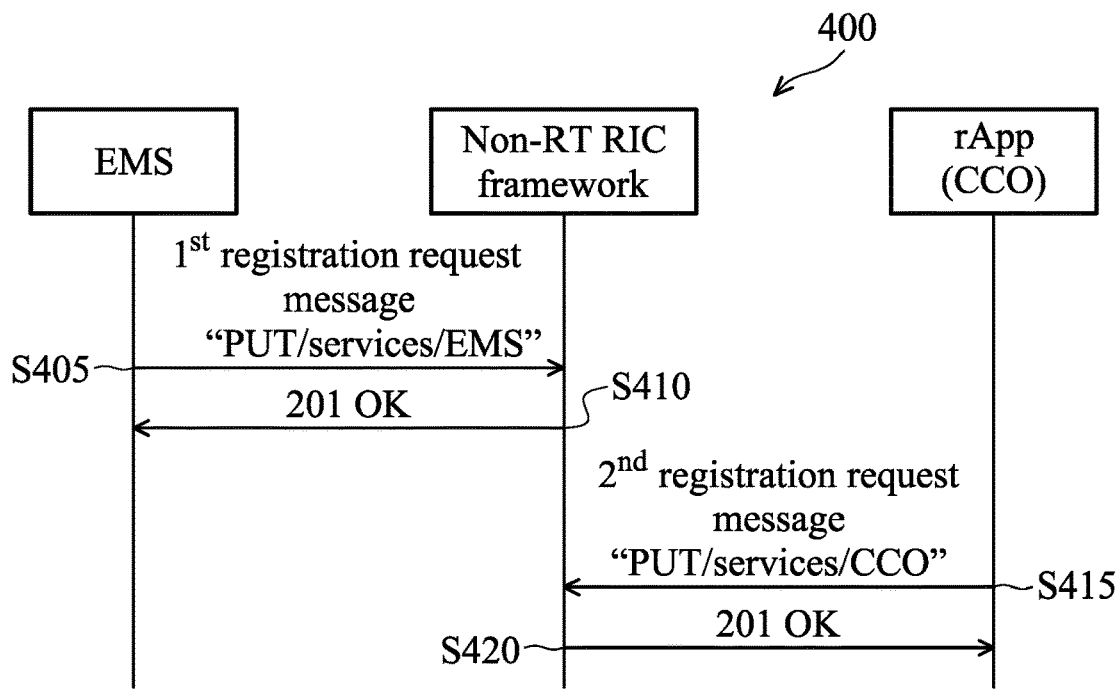
FIG. 4 is a flowchart illustrating the procedure for registering an EMS and a rApp with the Non-RT RIC framework according to an embodiment of the present disclosure.

FIG. 4 is a flowchart 400 illustrating the procedure for registering an EMS and a rApp with the Non-RT RIC framework according to an embodiment of the present disclosure.

In step S405, the EMS may transmit a first registration request message to the Non-RT RIC framework to request registration of the EMS, wherein the first registration request message may be an HTTP request (PUT) message, which may comprise an application programming interface (API) and an EMS identifier. For example, the first registration request message in FIG. 4 may be expressed as "PUT/services/EMS").

In step S410, in response to receiving the first registration request message, the Non-RT RIC framework may transmit an HTTP reply message to the EMS. In one example, the HTTP reply message may be a 201 OK message.

In step S415, the rApp may transmit a second registration request message to the Non-RT RIC framework to request registration of the CCO, wherein the second registration request message may be an HTTP request (PUT) message, which may comprise the API and a CCO identifier. For example, the second registration request message in FIG. 4 may be expressed as "PUT/services/CCO".

In step S420, in response to receiving the second registration request message, the Non-RT RIC framework may transmit an HTTP reply message to the rApp. In one example, the HTTP reply message may be a 201 OK message.

Figure 5:
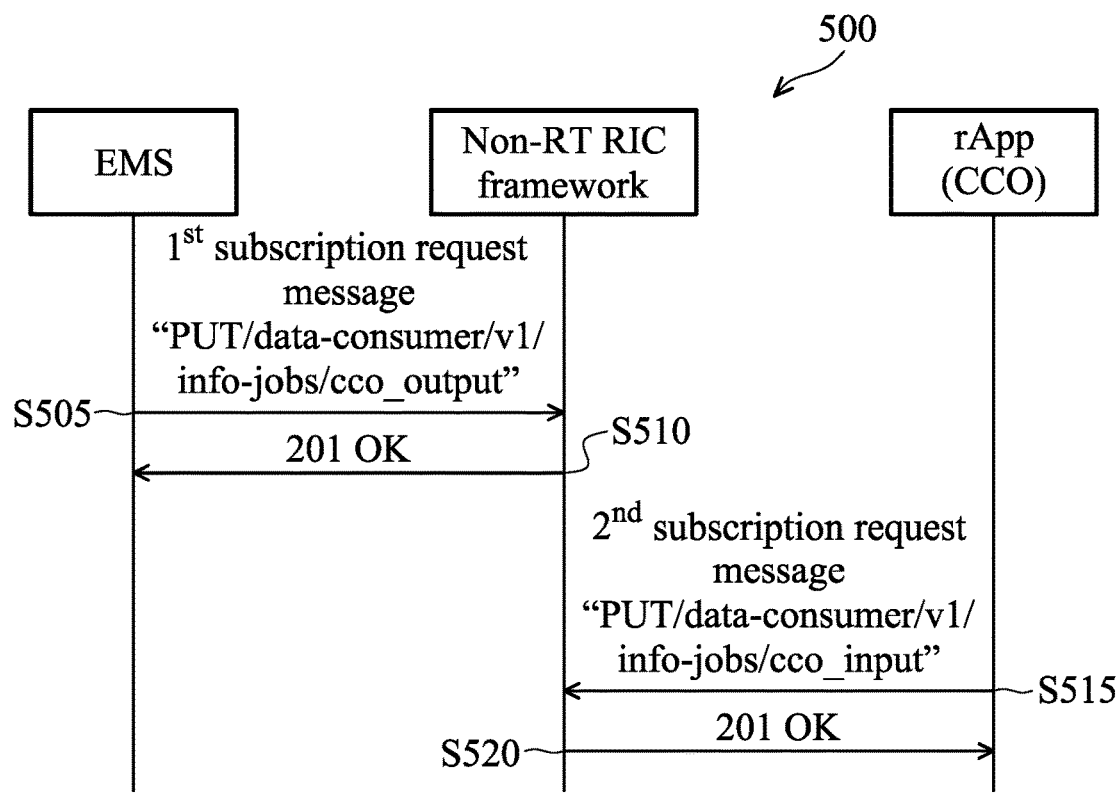
FIG. 5 is a flowchart illustrating a process of the EMS and the rApp subscribing data to the Non-RT RIC framework according to an embodiment of the present disclosure.

FIG. 5 is a flowchart 500 illustrating a process of the EMS and the rApp subscribing data to the Non-RT RIC framework according to an embodiment of the present disclosure.

In step S505, the EMS may transmit a first subscription request message to the Non-RT RIC framework to request to subscribe to the data required by the EMS, wherein the first subscription request message may be an HTTP request (PUT) message, which may comprise the API and data required to run the rApp (e.g., CCO). For example, the first subscription request message in FIG. 5 may be expressed as "PUT/data-consumer/v1/info-jobs/cco_output".

In step S510, in response to receiving the first subscription request message, the Non-RT RIC framework may transmit an HTTP reply message to the EMS. In one example, the HTTP reply message may be a 201 OK message.

In step S515, the rApp may transmit a second subscription request message to the Non-RT RIC framework to request to subscribe to the data required by the rApp, wherein the second subscription request message may be a HTTP request (PUT) message, which may comprise the API and data required to run a rApp (e.g., the CCO). For example, the second subscription request message in FIG. 5 may be expressed as "PUT/data-consumer/v1/info-jobs/cco_input".

In step S520, in response to receiving the second subscription request message, the Non-RT RIC framework may transmit an HTTP reply message to the rApp. In one example, the HTTP reply message may be a 201 OK message.

Figure 6:
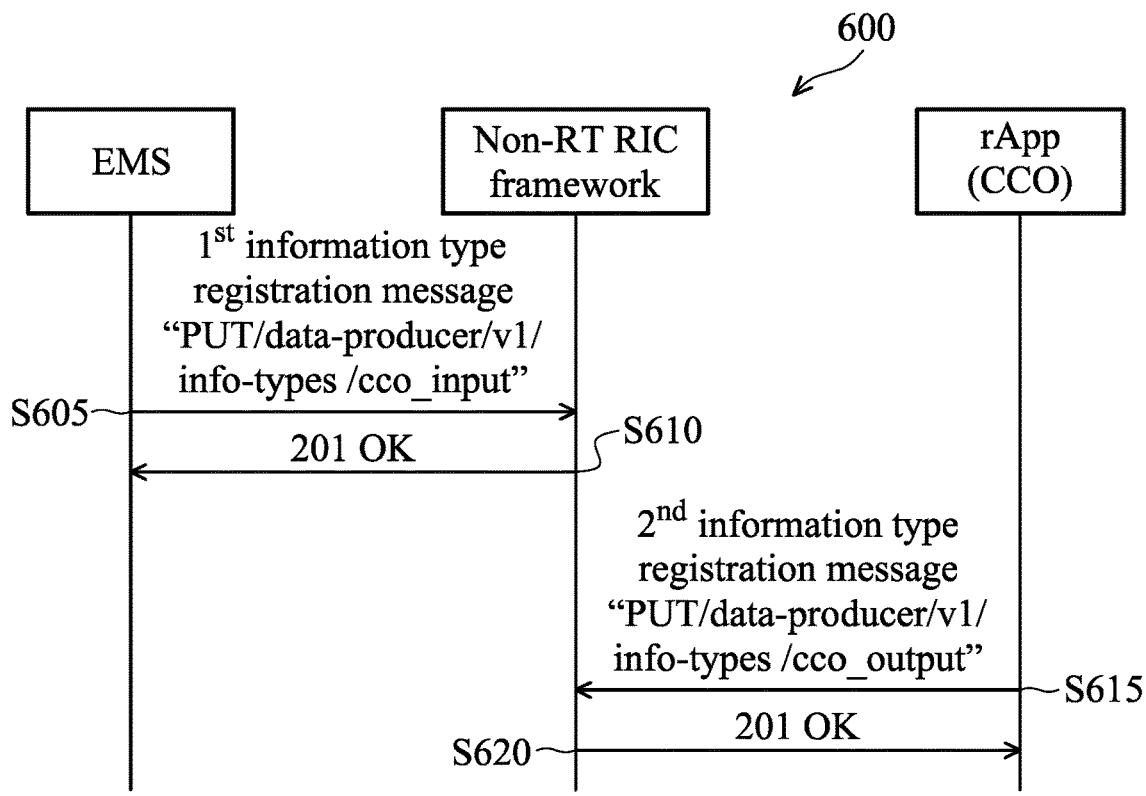
FIG. 6 is a flowchart illustrating a process of registering an information type provided by the EMS and the rApp with the Non-RT RIC framework for a service according to an embodiment of the present disclosure.

FIG. 6 is a flowchart 600 illustrating a process of registering an information type provided by the EMS and the rApp with the Non-RT RIC framework for a service according to an embodiment of the present disclosure.

In step S605, the EMS may transmit a first information type registration message to the Non-RT RIC framework to request registration of the information types that the EMS may provide, wherein the first information type registration message may be an HTTP request (PUT) message, which may comprise information types provided by the EMS. For example, the first information type registration message in FIG. 6 may be expressed as "PUT/data-producer/v1/info-types/cco_input".

In step S610, in response to receiving the first information type registration message, the Non-RT RIC framework may transmit an HTTP reply message to the EMS. In one example, the HTTP reply message may be a 201 OK message.

In step S615, the rApp may transmit a second information type registration message to the Non-RT RIC framework to request registration of the information types provided by the rApp, wherein the second information type registration message may be an HTTP request (PUT) message, which may comprise the information types provided by the rApp. For example, the second information type registration message in FIG. 6 may be expressed as "PUT/data-producer/v1/info-types/cco_output".

In step S620, in response to receiving the second information type registration message, the Non-RT RIC framework may transmit an HTTP reply message to the rApp. In one example, the HTTP reply message may be a 201 OK message.

Figure 7:
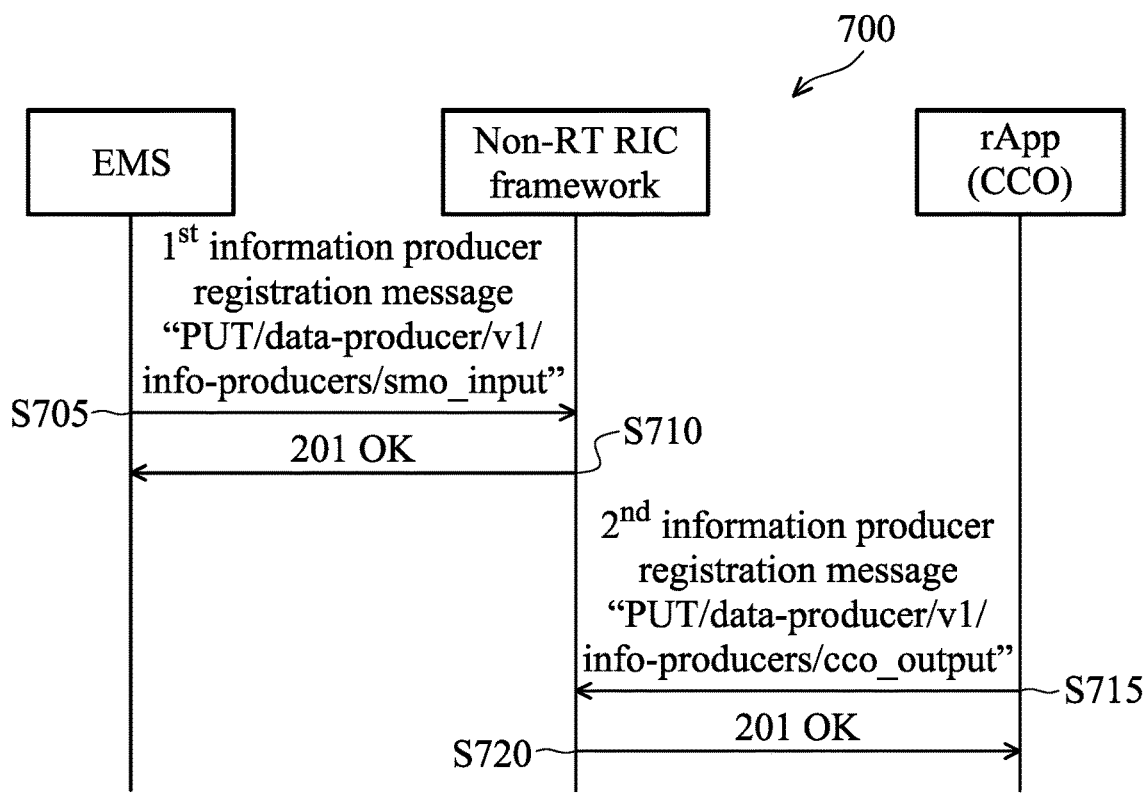
FIG. 7 is a flowchart illustrating a process of registering the EMS and the rApp with the Non-RT RIC framework as an information producer according to an embodiment of the present disclosure.

FIG. 7 is a flowchart 700 illustrating a process of registering the EMS and the rApp with the Non-RT RIC framework as an information producer according to an embodiment of the present disclosure.

In step S705, the EMS may transmit a first information producer registration message to the Non-RT RIC framework to request registration of the EMS as an information producer, wherein the first information producer registration message may be an HTTP request (PUT) message, which may indicate that the EMS is the information producer of the information types in step S605. For example, the first information producer registration message in FIG. 7 may be expressed as "PUT/data-producer/v1/info-producers/smo_input".

In step S710, in response to receiving the first information producer registration message, the Non-RT RIC framework may transmit an HTTP reply message to the EMS. In one example, the HTTP reply message may be a 201 OK message.

In step S715, the rApp may transmit a second information producer registration message to the Non-RT RIC framework to request to register the rApp as an information producer, wherein the second information producer registration message may be an HTTP request (PUT) message, which may indicate that the rApp is the information producer of the information types in step S615. For example, the second information producer registration message in FIG. 7 may be expressed as "PUT/data-producer/v1/info-producers/cco_output".

In step S720, in response to receiving the second information producer registration message, the Non-RT RIC framework may transmit an HTTP reply message to the rApp. In one example, the HTTP reply message may be a 201 OK message.

After the EMS and rApp complete the process of registering the EMS and the rApp with the Non-RT RIC framework, the process of the EMS and the rApp subscribing data to the Non-RT RIC framework, the process of registering an information type provided by the EMS and the rApp with the Non-RT RIC framework for a service, and the process of registering the EMS and the rApp with the Non-RT RIC framework as an information producer, the EMS may communicate with the rApp in the Non-RT RIC.

Figure 8:
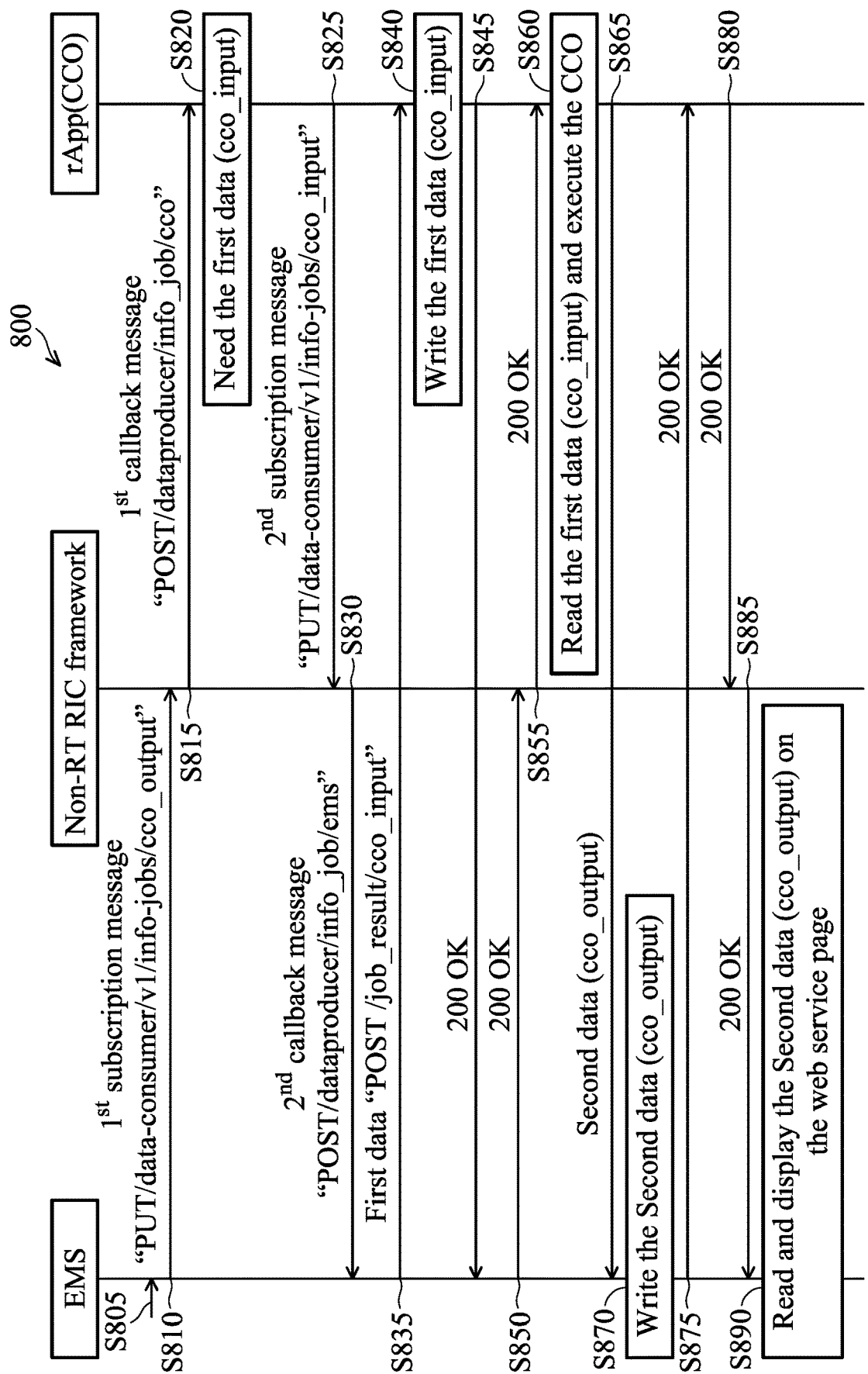
FIG. 8 is a flowchart illustrating the communication between the EMS and the rApp through the Non-RT RIC framework according to an embodiment of the present disclosure.

FIG. 8 is a flowchart 800 illustrating the communication between the EMS and the rApp through the Non-RT RIC framework according to an embodiment of the present disclosure.

It should be noted that although the operation performed by the rApp in FIG. 8 is based on Coverage and Capacity Optimization (CCO) as an example, those skilled in the art can make appropriate replacements or adjustments according to this embodiment.

In step S805, the EMS may receive a signal transmitted by the web service, and the signal instructs the EMS to run the CCO in the rApp.

In step S810, the EMS transmits a first subscription message to the Non-RT RIC framework to request the second data (cco_output) used to run the CCO in the rApp, wherein the first subscription message may be an HTTP request (PUT) message and comprises the IP address of the EMS. For example, in FIG. 8, the first subscription message may be expressed as "PUT/data-consumer/v1/info-jobs/cco_output".

After receiving the first subscription message, the Non-RT RIC framework determines that the provider that may provide the second data is the rApp. In step S815, the Non-RT RIC framework transmits a first callback message to the rApp according to the first subscription message to notify the rApp that the EMS requests the second data, wherein the first callback message may be an HTTP request (POST) message and comprises the IP address of the EMS. For example, the first callback message in FIG. 8 may be expressed as "POST/data-producer/info_job/cco".

In step S820, the rApp determines that the rApp itself needs the first data (cco_input).

In step S825, the rApp transmits a second subscription message to the Non-RT RIC framework, wherein the second subscription message is used to request the first data (cco_input), wherein the second subscription message may be an HTTP request (PUT) message and comprises the IP address of the rApp. For example, the second subscription message in FIG. 8 may be expressed as "PUT/data-consumer/v1/info-jobs/cco_input".

After receiving the second subscription message, the Non-RT RIC framework determines that the provider that may provide the first data is the EMS. In step S830, the Non-RT RIC framework transmits a second callback message to the EMS according to the second subscription message to notify the EMS that the rApp requests the first data, wherein the second callback message may be a HTTP request (POST) message and comprises the IP address of the rApp. For example, the second callback message in FIG. 8 may be expressed as "POST/data-producer/info_job/ems".

In step S835, the EMS transmits the first data to the rApp according to the IP address of the rApp in the second callback message, wherein the first data may be a HTTP (POST) messages. For example, the first data in FIG. 8 may be expressed as "POST/job_result/cco_input".

In step S840, the rApp writes the first data.

After the rApp writes the first data, in step S845, the rApp may transmit an HTTP reply message to the EMS in response to receiving the first data in step S835. In one example, the HTTP reply message may be a 200 OK message.

In step S850, in response to receiving the second callback message in step S830, the EMS may transmit an HTTP reply message to the Non-RT RIC framework. In one example, the HTTP reply message may be a 200 OK message.

In step S855, in response to receiving the second subscription message in step S825, the Non-RT RIC framework may transmit an HTTP reply message to the rApp. In one example, the HTTP reply message may be a 200 OK message.

In step S860, the rApp reads the first data and executes the CCO to generate the second data.

In step S865, the rApp transmits the second data to the EMS according to the IP address of the EMS in the first callback message, wherein the second data may be an HTTP (POST) message. For example, the second data in FIG. 8 may be expressed as "POST/job_result/cco_output".

In step S870, the EMS writes the second data.

After the EMS writes the second data, in step S875, the EMS may transmit an HTTP reply message to the rApp in response to receiving the second data in step S865. In one example, the HTTP reply message may be a 200 OK message.

In step S880, in response to receiving the first callback message in step S815, the rApp may transmit an HTTP reply message to the Non-RT RIC framework. In one example, the HTTP reply message may be a 200 OK message.

In step S885, in response to receiving the first subscription message in step S810, the Non-RT RIC framework may transmit an HTTP reply message to the EMS. In one example, the HTTP reply message may be a 200 OK message.

In step S890, the EMS reads the second data generated by the CCO executing the first data, and displays the second data on the web service page in step S805.

Figure 9:
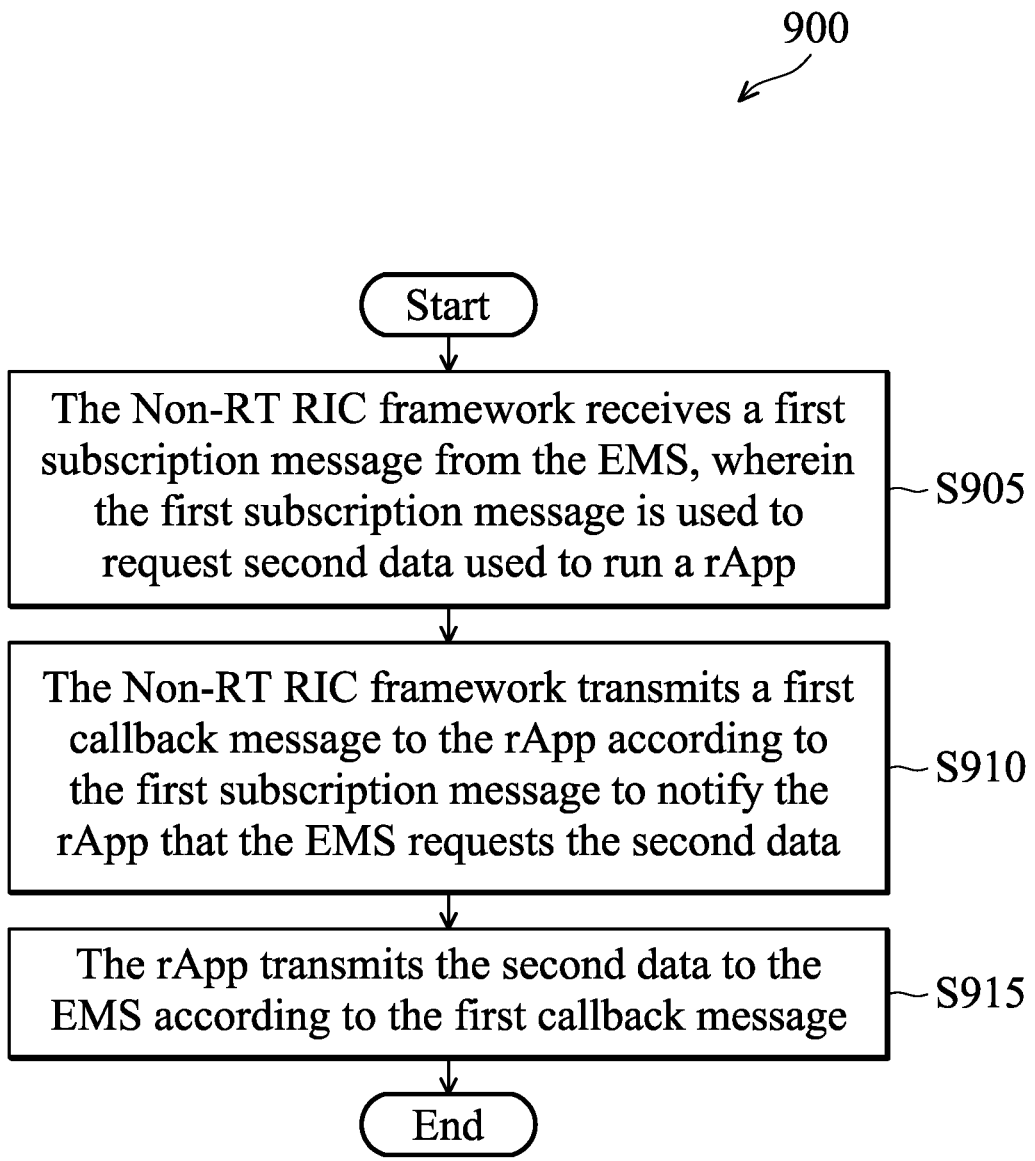
FIG. 9 is a flowchart illustrating a method for communication in service management and orchestration according to an embodiment of the present disclosure.

FIG. 9 is a flowchart illustrating a method 900 for communication in service management and orchestration according to an embodiment of the present disclosure. This method may be implemented by the EMS 310, the Non-RT RIC framework 322 and the rApp 324 as shown in FIG. 3.

In step S905, the Non-RT RIC framework receives a first subscription message from the EMS, wherein the first subscription message is used to request second data used to run a rApp, and the first subscription message comprises an IP address of the EMS.

In step S910, the Non-RT RIC framework transmits a first callback message to the rApp according to the first subscription message to notify the rApp that the EMS requests the second data, wherein the first callback message comprises the IP address of the EMS.

In step S915, the rApp transmits the second data to the EMS according to the first callback message.

In one embodiment, the Non-RT RIC framework is connected with the EMS through a service management and orchestration (SMO) internal interface.

As mentioned above, the method and system for communication in the service management and orchestration provided in the present disclosure connect the EMS and the Non-RT RIC framework through the service management and orchestration internal interface, and define the interaction specification between the EMS, the Non-RT RIC framework and the rApp, so that the purpose of data transmission between the EMS and the rApp in the SMO framework has achieved.

Having described embodiments of the present disclosure, an exemplary operating environment in which embodiments of the present disclosure may be implemented is described below. Referring to FIG. 10, an exemplary operating environment for implementing embodiments of the present disclosure is shown and generally known as an electronic device 1000. The electronic device 1000 is merely an example of a suitable computing environment and is not intended to limit the scope of use or functionality of the disclosure. Neither should the electronic device 1000 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 10, the electronic device 1000 may include a bus 1010 that is directly or indirectly coupled to the following devices: one or more memories 1012, one or more processors 1014, one or more display components 1016, one or more input/output (I/O) ports 1018, one or more input/output components 1020, and an illustrative power supply 1022. The bus 1010 may represent one or more kinds of busses (such as an address bus, data bus, or any combination thereof). Although the various blocks of FIG. 10 are shown with lines for the sake of clarity, and in reality, the boundaries of the various components are not specific. For example, the display component such as a display device may be considered an I/O component and the processor may include a memory.

The electronic device 1000 typically includes a variety of computer-readable media. The computer-readable media can be any available media that can be accessed by electronic device 1000 and includes both volatile and nonvolatile media, removable and non-removable media. By way of example, not limitation, computer-readable media may comprise computer storage media and communication media. The computer storage media may include volatile and non-volatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the electronic device 1000. The computer storage media may not comprise signals per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 1012 may include computer-storage media in the form of volatile and/or nonvolatile memory. The memory may be removable, non-removable, or a combination thereof. Exemplary hardware devices include solid-state memory, hard drives, optical-disc drives, etc. The electronic device 1000 includes one or more processors that read data from various entities such as the memory 1012 or the I/O components 1020. The display component(s) 1016 present data indications to a user or to another device. Exemplary presentation components include a display device, speaker, printing component, vibrating component, etc.

The I/O ports 1018 allow the electronic device 1000 to be logically coupled to other devices including the I/O components 1020, some of which may be embedded. Illustrative components include a microphone, joystick, game pad, satellite dish, scanner, printer, wireless device, etc. The I/O components 1020 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the electronic device 1000, or any combination thereof. The electronic device 1000 may be equipped with depth cameras, such as stereoscopic camera systems, infrared camera systems, RGB camera systems, or any combination thereof, to realize gesture detection and recognition. Furthermore, the electronic device 1000 may be equipped with accelerometers or gyroscopes that enable detection of motion. The output of the accelerometers or gyroscopes may be provided to the display of the electronic device 1000 to carry out immersive augmented reality or virtual reality.

Furthermore, the processor 1014 in the electronic device 1000 can execute the program code in the memory 1012 to perform the above-described actions and steps or other descriptions herein.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for communication in service management and orchestration, comprising:
    receiving, by a Non-real time radio access network (RAN) Intelligent Controller (Non-RT RIC) framework, a first subscription message from an Element Management System (EMS), wherein the first subscription message is used to request second data used to run a Non-RT RIC application (rApp);
    transmitting, by the Non-RT RIC framework, a first callback message to the rApp according to the first subscription message to notify the rApp that the EMS requests the second data;
    transmitting, by the rApp, a second subscription message to the Non-RT RIC framework, wherein the second subscription message is used to request first data used to generate the second data;
    transmitting, by the Non-RT RIC framework, a second callback message to the EMS according to the second subscription message;
    transmitting, by the EMS, the first data to the rApp according to the second callback message;
    obtaining, by the rApp, the second data according to the first data; and
    transmitting, by the rApp, the second data to the EMS according to the first callback message.

2. The method as claimed in claim 1, further comprising:
    reading, by the EMS, the second data, and displaying the second data on a web service page.

3. The method as claimed in claim 1, wherein before the Non-RT RIC framework receives the first subscription message from the EMS, the method further comprises:
    performing, by the EMS, a first registration procedure on the Non-RT RIC framework; and
    performing, by the rApp, a second registration procedure on the Non-RT RIC framework.

4. The method as claimed in claim 3, wherein the first registration procedure comprises the following steps:
    transmitting, by the EMS, a first registration request message to the Non-RT RIC framework to request registration of the EMS;
    transmitting, by the EMS, a first subscription request message to the Non-RT RIC framework to request to subscribe to the data required by the EMS;
    transmitting, by the EMS, a first information type registration message to the Non-RT RIC framework to request registration of the information types provided by the EMS; and
    transmitting, by the EMS, a first information producer registration message to the Non-RT RIC framework to request to register the EMS as an information producer.

5. The method as claimed in claim 3, wherein the second registration procedure comprises the following steps:
    transmitting, by the rApp, a second registration request message to the Non-RT RIC framework to request registration of the rApp;
    transmitting, by the rApp, a second subscription request message to the Non-RT RIC framework to request to subscribe to the data required by the rApp;
    transmitting, by the rApp, a second information type registration message to the Non-RT RIC framework to request registration of the information types provided by the rApp; and
    transmitting, by the rApp, a second information producer registration message to the Non-RT RIC framework to request to register the rApp as an information producer.

6. The method as claimed in claim 1, wherein an IP address of the EMS is included in the first subscription message and the first callback message.

7. The method as claimed in claim 1, wherein an IP address of the rApp is included in the second subscription message and the second callback message.

8. The method as claimed in claim 1, wherein the Non-RT RIC framework is connected with the EMS through a service management and orchestration (SMO) internal interface.

9. The method as claimed in claim 1, wherein the Non-RT RIC framework is connected with the rApp through an R1 interface.

10. A system for communication in service management and orchestration, comprising:
    an Element Management System (EMS);
    a Non-real time radio access network (RAN) Intelligent Controller (Non-RT RIC) application (rApp); and a Non-RT RIC framework, coupled to the EMS and the rApp;

wherein the Non-RT RIC framework receives a first subscription message from the EMS, wherein the first subscription message is used to request second data used to run the rApp;

the Non-RT RIC framework transmits a first callback message to the rApp according to the first subscription message to notify the rApp that the EMS requests the second data;

the rApp transmits a second subscription message to the Non-RT RIC framework, wherein the second subscription message is used to request first data used to generate the second data;

the Non-RT RIC framework transmits a second callback message to the EMS according to the second subscription message;

the EMS transmits the first data to the rApp according to the second callback message;

the rApp obtains the second data according to the first data; and the rApp transmits the second data to the EMS according to the first callback message.

11. The system as claimed in claim 10, wherein the system further executes the following actions:

the EMS reads the second data, and displays the second data on a web service page.

12. The system as claimed in claim 10, wherein before the Non-RT RIC framework receives the first subscription message from the EMS, the system further executes the following actions:

the EMS performs a first registration procedure on the Non-RT RIC framework; and the rApp performs a second registration procedure on the Non-RT RIC framework.

13. The system as claimed in claim 12, wherein the first registration procedure comprises the following actions:

the EMS transmits a first registration request message to the Non-RT RIC framework to request registration of the EMS;

the EMS transmits a first subscription request message to the Non-RT RIC framework to request to subscribe to the data required by the EMS;

the EMS transmits a first information type registration message to the Non-RT RIC framework to request registration of the information types provided by the EMS; and the EMS transmits a first information producer registration message to the Non-RT RIC framework to request to register the EMS as an information producer.

14. The system as claimed in claim 12, wherein the second registration procedure comprises the following actions:

the rApp transmits a second registration request message to the Non-RT RIC framework to request registration of the rApp;

the rApp transmits a second subscription request message to the Non-RT RIC framework to request to subscribe to the data required by the rApp;

the rApp transmits a second information type registration message to the Non-RT RIC framework to request registration of the information types provided by the rApp; and the rApp transmits a second information producer registration message to the Non-RT RIC framework to request to register the rApp as an information producer.

15. The system as claimed in claim 10, wherein an IP address of the EMS is included in the first subscription message and the first callback message.

16. The system as claimed in claim 10, wherein an IP address of the rApp is included in the second subscription message and the second callback message.

17. The system as claimed in claim 10, wherein the Non-RT RIC framework is connected with the EMS through a service management and orchestration (SMO) internal interface.

18. The system as claimed in claim 10, wherein the Non-RT RIC framework is connected with the rApp through an R1 interface.

19. A system for communication in service management and orchestration, comprising:

an Element Management System (EMS);

a Non-real time radio access network (RAN) Intelligent Controller (Non-RT RIC) application (rApp); and a Non-RT RIC framework, coupled to the EMS and the rApp;

wherein the Non-RT RIC framework receives a first subscription message from the EMS, wherein the first subscription message is used to request second data used to run the rApp;

the Non-RT RIC framework transmits a first callback message to the rApp according to the first subscription message to notify the rApp that the EMS requests the second data; and the rApp transmits the second data to the EMS according to the first callback message, wherein before the Non-RT RIC framework receives the first subscription message from the EMS, the system further executes the following actions:

the EMS performs a first registration procedure on the Non-RT RIC framework; and the rApp performs a second registration procedure on the Non-RT RIC framework, wherein the first registration procedure comprises the following actions:

the EMS transmits a first registration request message to the Non-RT RIC framework to request registration of the EMS;

the EMS transmits a first subscription request message to the Non-RT RIC framework to request to subscribe to the data required by the EMS;

the EMS transmits a first information type registration message to the Non-RT RIC framework to request registration of the information types provided by the EMS; and the EMS transmits a first information producer registration message to the Non-RT RIC framework to request to register the EMS as an information producer.

20. The system as claimed in claim 19, wherein the second registration procedure comprises the following actions:

the rApp transmits a second registration request message to the Non-RT RIC framework to request registration of the rApp;

the rApp transmits a second subscription request message to the Non-RT RIC framework to request to subscribe to the data required by the rApp;

the rApp transmits a second information type registration message to the Non-RT RIC framework to request registration of the information types provided by the rApp; and the rApp transmits a second information producer registration message to the Non-RT RIC framework to request to register the rApp as an information producer.

\* \* \* \* \*